(12) United States Patent
Giraudet et al.

(10) Patent No.: US 11,500,224 B2
(45) Date of Patent: Nov. 15, 2022

(54) METHOD AND SYSTEM FOR DETERMINING AN OPTICAL SYSTEM INTENDED TO EQUIP A PERSON ON THE BASIS OF THE ADAPTABILITY OF THE PERSON TO A VISUAL AND/OR PROPRIOCEPTIVE MODIFICATION OF HIS/HER ENVIRONMENT

(71) Applicants: Essilor International, Charenton-le-Pont (FR); Universite de Montreal, Montreal (CA)

(72) Inventors: Guillaume Giraudet, Charenton-le-Pont (FR); Jocelyn Faubert, Montreal (CA); Rafael Doti, Montreal (CA); Eduardo Lugo, Montreal (CA)

(73) Assignees: Essilor International, Charenton-le-Pont (FR); Universite de Montreal, Montreal (CA)

( * ) Notice: Subject to any disclaimer, the term of this patent is extended or adjusted under 35 U.S.C. 154(b) by 197 days.

(21) Appl. No.: 16/643,222

(22) PCT Filed: Aug. 30, 2018

(86) PCT No.: PCT/EP2018/073314
§ 371 (c)(1),
(2) Date: Feb. 28, 2020

(87) PCT Pub. No.: WO2019/043086
PCT Pub. Date: Mar. 7, 2019

(65) Prior Publication Data
US 2020/0348536 A1 Nov. 5, 2020

(30) Foreign Application Priority Data
Aug. 31, 2017 (EP) .................................. 17188844

(51) Int. Cl.
*G02C 7/02* (2006.01)
*G02C 7/08* (2006.01)

(52) U.S. Cl.
CPC ............. *G02C 7/027* (2013.01); *G02C 7/081* (2013.01); *G02C 7/088* (2013.01)

(58) Field of Classification Search
CPC ................................ G02C 7/088; G02C 7/081
See application file for complete search history.

(56) References Cited

U.S. PATENT DOCUMENTS

2003/0107707 A1    6/2003    Fisher
2009/0219486 A1    9/2009    Bonnin et al.
(Continued)

FOREIGN PATENT DOCUMENTS

EP    1 862 110 A1    12/2007
EP    2 370 851 A1    10/2011
(Continued)

OTHER PUBLICATIONS

International Search Report and Written Opinion dated Dec. 17, 2018 in PCT/EP2018/073314 filed on Aug. 30, 2018.

*Primary Examiner* — James R Greece
(74) *Attorney, Agent, or Firm* — Oblon, McClelland, Maier & Neustadt, L.L.P.

(57) ABSTRACT

A method for determining an optical system intended to equip a person on the basis of the adaptability of the person to a visual and/or proprioceptive modification of his environment, the method. including a person visual behaviour parameter providing, during which a person visual behaviour parameter indicative of the visual behaviour of the person relative to a given state of the environment is provided; a reference value providing, during which a first value of the person visual behaviour pa ameter corresponding to a reference state of the environment is provided; a visual and/or proprioceptive modification providing, during
(Continued)

which a visual and/or proprioceptive modification of the reference state of the environment is provided so as to define a modified state of the environment; and determining, during which an optical parameter of the optical system is determined based on the first value of the person visual behaviour parameter and on a second value of the person visual behaviour parameter associated with the modified state of the environment.

17 Claims, 4 Drawing Sheets

(56) References Cited

U.S. PATENT DOCUMENTS

| 2012/0019776 A1* | 1/2012 | Giraudet | A61B 3/1015 351/204 |
|---|---|---|---|
| 2012/0113394 A1 | 5/2012 | Bonnin et al. | |
| 2015/0077711 A1 | 3/2015 | Bonnin et al. | |
| 2016/0270656 A1* | 9/2016 | Samec | A61B 3/063 |
| 2017/0299888 A1* | 10/2017 | Tranvouez | G02C 7/02 |
| 2017/0371179 A1 | 12/2017 | Scherlen et al. | |

FOREIGN PATENT DOCUMENTS

| EP | 2 419 782 A1 | 2/2012 |
|---|---|---|
| EP | 2 440 903 A1 | 4/2012 |
| EP | 3 006 991 A1 | 4/2016 |
| WO | WO 01/62139 A1 | 8/2001 |
| WO | WO 2009/150378 A2 | 12/2009 |
| WO | WO 2009/150378 A3 | 12/2009 |
| WO | WO 2010/072840 A1 | 7/2010 |
| WO | WO 2015/173381 A1 | 11/2015 |
| WO | WO 2016/055265 A1 | 4/2016 |
| WO | WO 2016/113506 A1 | 7/2016 |

* cited by examiner

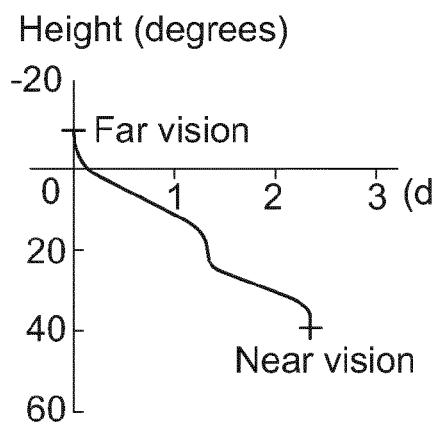
Fig. 5A
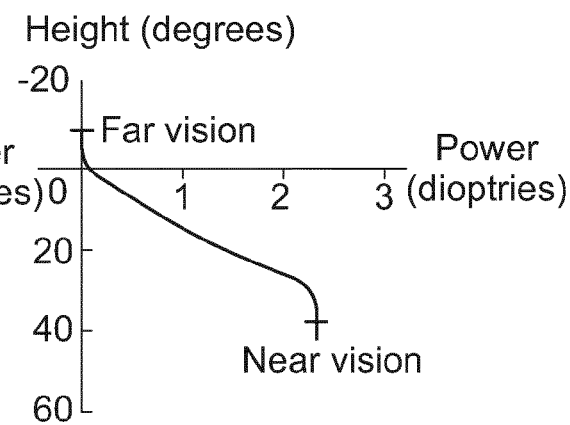
Fig. 5B
avala un haricot de tra
Fig. 6
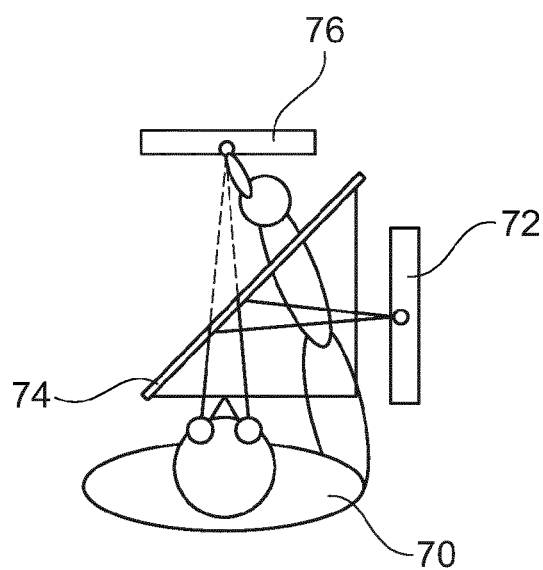
Fig. 7

METHOD AND SYSTEM FOR DETERMINING AN OPTICAL SYSTEM INTENDED TO EQUIP A PERSON ON THE BASIS OF THE ADAPTABILITY OF THE PERSON TO A VISUAL AND/OR PROPRIOCEPTIVE MODIFICATION OF HIS/HER ENVIRONMENT

FIELD OF THE INVENTION

The invention relates to a method and a system for determining an optical system intended to equip a person on the basis of the adaptability of the person to a visual and/or proprioceptive modification of his environment. The invention also relates to a computer program product comprising one or more stored sequences of instructions that is accessible to a processor and which, when executed by the processor, causes the processor to carry out the steps of the method according to the invention.

BACKGROUND OF THE INVENTION

Ophthalmic lenses intended to be held in a frame usually involve a prescription. The ophthalmic prescription can include a positive or negative power prescription as well as an astigmatism prescription. These prescriptions correspond to corrections enabling the wearer of the lenses to correct defects of his/her vision. A lens is fitted in the frame in accordance with the prescription and with the position of the wearer's eyes relative to the frame.

For presbyopic wearers, the value of the power correction is different for far vision and near vision, due to the difficulties of accommodation in near vision.

The prescription thus comprises a far-vision power value and an addition, or power progression, representing the power increment between far vision and near vision; this comes down to a far-vision power prescription and a near-vision power prescription. Ophthalmic lenses suitable for presbyopic wearers are bifocals, trifocals and progressive addition lenses.

Progressive addition ophthalmic lenses include a far-vision zone, a near-vision zone and an intermediate-vision zone, a principal progression meridian crossing these three zones. They are generally determined by optimization, based on a certain number of constraints imposed on the different features of the lens.

Nevertheless, progressive addition lenses (PAL) generate aberrations, notably aberrations blur, that in particular reduce the field of view and distortion that creates for example the well known swim effect. The design of the lens is necessarily a compromise between these aberrations.

Consequently, some wearer may have difficulties to adapt to the use of progressive addition lenses despite normal binocular vision and other normal clinical findings.

Thus, there is a need for simple and reliable method to determine this adaptability for a person before choosing a new optical equipment for the person.

An aim of the present invention is to propose a method and a system that allow for the fastest and most complete adaptation and comfort to a new optical equipment.

SUMMARY OF THE INVENTION

To this end, the invention proposes a method for determining an optical system intended to equip a person on the basis of the adaptability of the person to a visual and/or proprioceptive modification of his environment, the method comprising:
  a person visual behaviour parameter providing step, during which a person visual behaviour parameter indicative of the visual behaviour of the person relative to a given state of the environment is provided;
  a reference value providing step, during which a first value of the person visual behaviour parameter corresponding to a reference state of the environment is provided;
  a visual and/or proprioceptive modification providing step, during which a visual and/or proprioceptive modification of the reference state of the environment is provided so as to define a modified state of the environment; and
  a determining step during which an optical parameter of the optical system is determined based on the first value of the person visual behaviour parameter and on a second value of the person visual behaviour parameter associated with the modified state of the environment.

Advantageously, the method according to the invention allows determining an optical system adapted to a person by determining the adaptability of the person to a visual and/or proprioceptive modification of the environment of the person and even before choosing the new optical system for the person. This method allows either selecting the best optical system for the person or making a customized one integrating this measure of the "adaptability" of the individual.

For example, the chosen design thanks to the invention will have a more or less wide field of view in intermediate vision for the work on screen according to the level of adaptation evaluated.

According to another example, the measurement of the adaptability of the vertical movements of the eyes and of the head to prismatic effects may make it possible to modify the vertical position of the beginning of the power progression of a progressive addition lens.

According to another example, the invention allows to adjust the field widths in far vision or near vision as a function of eye-head coordination adaptability in the horizontal axis of the person.

According to further embodiments that can be considered alone or combined according to all the possible combinations:
  the method further comprises an evaluating step, during which an index representative of the adaptability of the person is evaluated based on the first and second values of the person visual behaviour parameter;
  the method further comprises a visual and/or proprioceptive modification cancelling step, during which the provided visual and/or proprioceptive modification is cancelled, the second value of the person visual behaviour parameter being further associated with the cancellation of the visual and/or proprioceptive modification so as to take into account an after-effect value of the person visual behaviour parameter of the person for the determination of the optical parameter of the optical system;
  the person visual behaviour parameter comprises visual-motor coordination data representative of the visual-motor coordination of the person;
  the method further comprises:
    a visual display device providing step, during which a visual display device is provided and arranged so as to display a dynamic visual pattern to the person, and a display step, during which a dynamic visual pattern is displayed on the visual display device to the person at least during the modified state;

the visual and/or proprioceptive modification step comprises a visual modification step, during which the dynamic visual pattern displayed by the visual display device to the person comprises a varying blur parameter and/or a varying defocus parameter and/or a varying distortion parameter and/or a varying field of view parameter;

the visual and/or proprioceptive modification step comprises a proprioceptive modification step, during which a constraint is provided to the person, the constraint comprising:

a motor constraint associated to the control of the postural stability or of the locomotion of the person; and/or a constraint associated to the movements of the head of the person; and/or a proprioceptive constraint of the person;

the method further comprises a person visual behaviour parameter measurement step during which the person visual behaviour parameter of the person is measured;

the person visual behaviour parameter is measured upon a perception test carried out on the person;

the optical system comprises an ophthalmic lens, preferably a progressive addition lens;

the optical parameter of the ophthalmic lens comprises at least lens design data indicative of a lens design adapted to the person;

the lens design comprises at least the dioptric lens design and/or a distortion distribution and/or geometrical parameters of the optical lens and/or prescription data and/or ophthalmic parameters relating to the ophthalmic requirements of the person.;

the first and second values of the person visual behaviour parameter are indicative of the capability of the person to adapt to the progressive addition lens.

Another object of the invention relates to a system for determining an optical system intended to equip a person on the basis of the evaluation of the adaptability of the person to a visual and/or proprioceptive modification of his environment, the system comprising:

receiving means adapted to receive a first value of a person visual behaviour parameter indicative of the visual behaviour of the person relative to a given state of the environment, said first value corresponding to a reference state of the environment;

modification means arranged and configured to provide to the person a visual and/or proprioceptive modification of the reference state of the environment so as to define a modified state of the environment; and calculation means configured to determine an optical parameter of the optical system on the basis on the first value of the person visual behaviour parameter and on a second value of the person visual behaviour parameter associated with the modified state of the environment.

The invention also relates to a computer program product comprising one or more stored sequences of instructions that are accessible to a processor and which, when executed by the processor, causes the processor to carry out the steps of the method according to the invention.

The invention also relates to a computer-readable storage medium having a program recorded thereon, where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which:

FIG. 5A and 5B illustrates respectively a double-progression form and a "classical" progression form in intermediate vision for a lens design;

FIG. 6 illustrates an example of restriction of perceptual span;

FIG. 7 is an example of a device for measuring an adaptation to a pointing error;

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

An object of the invention relates to a method for determining an optical system intended to equip a person on the basis of the adaptability of the person to a visual and/or proprioceptive modification of his environment.

The optical system comprises at least an ophthalmic lens, preferably a progressive addition lens. In the remainder of the description, the optical system comprises a progressive addition lens.

Figure 1:
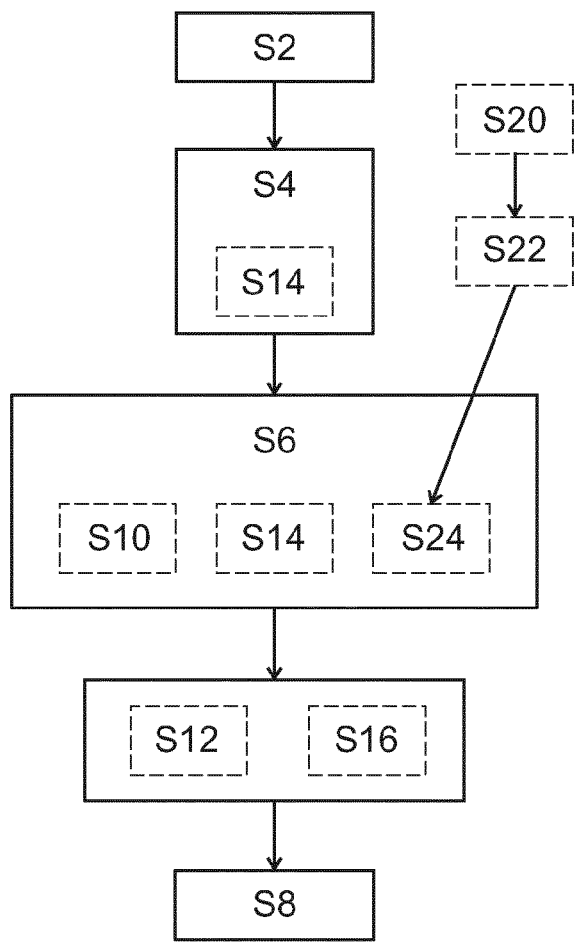
FIG. 1 is an illustration of a chart-flow of a method for adapting the visual and/or visual-motor behaviour of a person according to the invention.

With reference to FIG. 1, the method for determining an optical system according to the invention comprises at least:
   a person visual behaviour parameter providing step S2,
   a reference value providing step S4,
   a visual and/or proprioceptive modification providing step S6, and
   a determining step S8.

During the person visual behaviour parameter providing step S2, a person visual behaviour parameter indicative of the visual behaviour of the person relative to a given state of the environment is provided.

Preferably, the person visual behaviour parameter comprises visual-motor coordination data representative of the visual-motor coordination of the person.

Then a first value of the person visual behaviour parameter corresponding to a reference state of the environment is provided during the reference value providing step S4.

During the visual and/or proprioceptive modification providing step S6, a visual and/or proprioceptive modification of the reference state of the environment is provided so as to define a modified state of the environment.

Preferably, the visual and/or proprioceptive modification step S6 comprises a proprioceptive modification step S10, during which a constraint is provided to the person.

The constraint advantageously comprises:
   a motor constraint associated to the control of the postural stability or of the locomotion of the person ; and/or
   a constraint associated to the movements of the head of the person; and/or
   a proprioceptive constraint of the person.

Indeed, the evaluated adaptability of the person preferably relates to the adaptability to visual field constraints, blur or defocus constraints, distortion constraints, motor constraints related to postural balance control or locomotion, constraints on vestibular information related to the linear or nonlinear acceleration of the head, proprioceptive constraints.

Then an optical parameter of the optical system is determined based on the first value of the person visual behaviour parameter and on a second value of the person visual behaviour parameter associated with the modified state of the environment during the determining step S8.

Preferably, the optical parameter of the ophthalmic lens comprises at least lens design data indicative of a lens design adapted to the person. More particularly, the lens design comprises at least one of the following parameters:
   the dioptric lens design,
   a distortion distribution,
   geometrical parameters of the optical lens,
   prescription data,
   ophthalmic parameters relating to the ophthalmic requirements of the person.

In the sense of the invention, the prescription is a set of optical characteristics of optical power, of astigmatism and, where relevant, of addition, determined by an ophthalmologist in order to correct the vision defects of an individual, for example by means of a lens positioned in front of his eye. Generally speaking, the prescription for a progressive addition lens comprises values of optical power and of astigmatism at the distance-vision point and, where appropriate, an addition value.

Furthermore, the wording "optical design" is a widely used wording known from the man skilled in the art in ophthalmic domain to designate the set of parameters allowing defining a dioptric function of an ophthalmic lens; each ophthalmic lens designer has its own designs, particularly for progressive ophthalmic lenses. The dioptric function corresponds to the optical lens power (mean power, astigmatism, the prismatic deviation, etc . . . ) as a function of the gaze direction. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:
   a power profile along the main gaze directions (meridian line) used by the lens wearer during day life activities,
   distributions of powers (mean power, astigmatism, . . . ) on the sides of the lens, that is to say away from the main gaze directions.

Advantageously, the first and second values of the person visual behaviour parameter are indicative of the capability of the person to adapt to the progressive addition lens.

According to an embodiment, the method further comprises an evaluating step S12, during which an index representative of the adaptability of the person is evaluated based on the first and second values of the person visual behaviour parameter.

For example, the index can be evaluated based on the difference between the first and second values.

According to another example, the index can be evaluated based on a parameter related to the time to reach the second value.

Furthermore, according to another embodiment compatible with the previous one, the method can further comprise a person visual behaviour parameter measurement step S14. The person visual behaviour parameter of the person is measured during the step S14. Thus, the first value of the person visual behaviour parameter corresponding to the reference state of the environment of the person can be measured during the step S4. Moreover, the second value of the person visual behaviour parameter associated with the modified state of the environment can also be measured during the visual and/or proprioceptive modification providing step S6.

Preferably, the person visual behaviour parameter is measured upon a perception test carried out on the person.

According to another embodiment compatible with the previous ones, the method further comprises a visual and/or proprioceptive modification cancelling step S16. During this step S16, the provided visual and/or proprioceptive modification is cancelled. In this case, the second value of the person visual behaviour parameter is further associated with the cancellation of the visual and/or proprioceptive modification so as to take into account an after-effect value of the person visual behaviour parameter of the person for the determination of the optical parameter of the optical system.

According to another embodiment compatible with the previous one, the method further comprises
a visual display device providing step S20, and
a display step S22.

During the visual display device providing step S20, a visual display device is provided and arranged so as to display a dynamic visual pattern to the person.

Then, a dynamic visual pattern is displayed on the visual display device to the person at least during the modified state during the display step S22.

Preferably, the visual and/or proprioceptive modification step S6 comprises a visual modification step S24. During the step S24, the dynamic visual pattern displayed by the visual display device to the person comprises a varying blur parameter and/or a varying defocus parameter and/or a varying distortion parameter and/or a varying field of view parameter.

Figure 2:
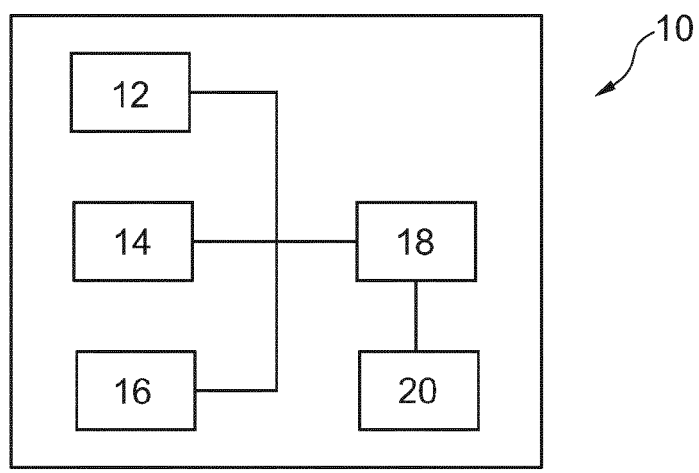
FIG. 2 is a schematic representation of a device configured to implement the method according to an embodiment of the invention.

A system 10 for execution of the method for determining an optical system intended to equip a person on the basis of the evaluation of the adaptability of the person to a visual and/or proprioceptive modification of his environment according to the invention will now be described with reference to FIG. 2.

The system 10 comprises at least receiving means 12, modification means 14 and calculation means 16.

The receiving means 12 are adapted to receive a first value of a person visual behaviour parameter indicative of the visual behaviour of the person relative to a given state of the environment. Said first value corresponds to a reference state of the environment.

The modification means 14 are arranged and configured to provide to the person a visual and/or proprioceptive modification of the reference state of the environment so as to define a modified state of the environment.

According to an example, the modification means 14 can comprise a visual display device.

Figure 3:
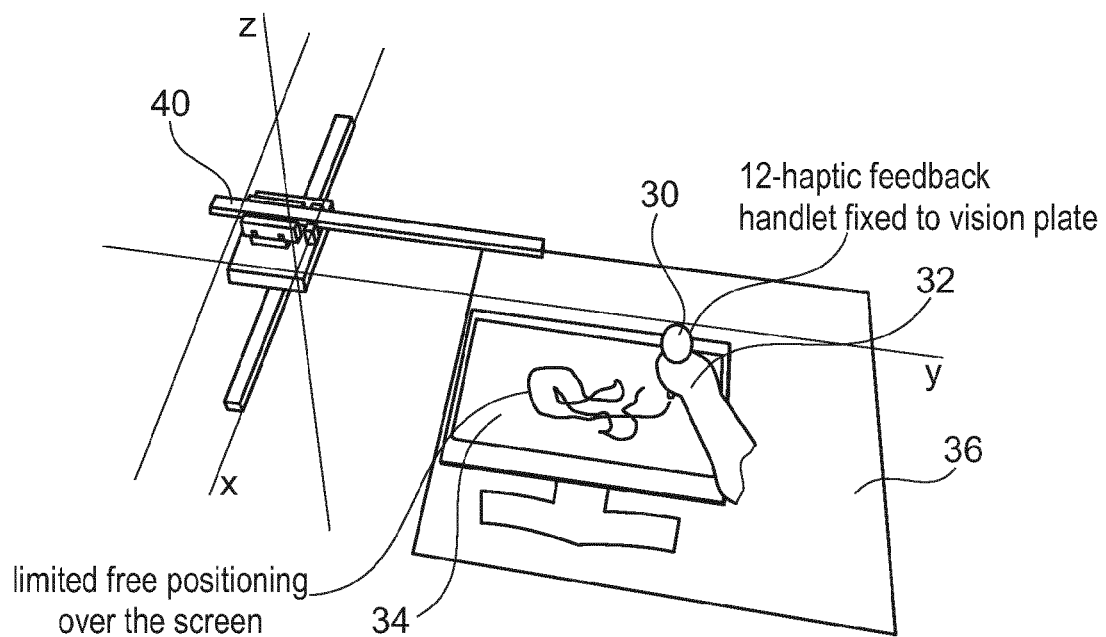
FIG. 3 is an example of an embodiment of a system according to the invention.

According to another example of a system according to the invention and illustrated on FIG. 3, the system comprises a lever 30, a visual display device comprising a screen 34, control means 40. During the modification step, the person holds the lever 30 in his/her hand 32 with which the person must intercept visual targets displayed on the screen 34. The lever 30 is associated with a support 36. The resistance to movement of the lever 30 and its support 36 is controlled by control means 40 of the system to which they are connected. For example, the modification means 14 of the system are configured to provide a gradual modification of the displacement resistance of the lever 30. The person must then make an increasingly important effort to make the same displacements and ensure a good performance. A first evaluation can be, for example, to determine the time necessary for the person to regain his initial level of performance, ie without displacement resistance of the lever. Then, when the displacement resistance is cancelled, the person then makes an error of displacement. This is called the after-effect.

The calculation means 16 are configured to determine an optical parameter of the optical system on the basis of the first value of the person visual behaviour parameter and on a second value of the person visual behaviour parameter associated with the modified state of the environment.

Advantageously, the system comprises a processor 18 and a memory 20 storing one or more sequences of instructions that are accessible to the processor and which, when executed by the processor, causes the processor to carry out the steps of the method according to the invention.

Examples of implementation of the method and/or of the system according to the invention will now be described.

EXAMPLE 1

Adaptation of Eye-Head Coordination and Determining of a Customized PAL Design

Ophthalmic lenses having a progressive power ensure clear vision at all distances for people who have lost, completely or not, the ability to accommodate. This continuous progression of power from the top to the bottom of the lens, along a meridian, is accompanied by optical distortions in the periphery. Even if these distortions can not be removed from the lens, their distribution can be precisely controlled. In this first example, the method allows providing a new criterion for the customized distribution of these peripheral deformations. This criterion is based on the ability of the wearer to adapt to visual or proprioceptive constraints in his strategy of coordination of his eyes and his head to explore his environment.

To this end, a reference eye-head coordination is first measured. It can be the "horizontal" strategy linked to the exploration of targets presented to the right or left of the observer, or the "vertical" strategy related to the perception of objects positioned in the lower visual field, on the ground, straight ahead, in the context of obstacle crossing for example. Once this reference value is obtained, at least one constraint is added. It may be a visual constraint, such as prisms or preferably diaphragms whose diameter can be adjusted in order to reduce more or less the usable field of view. It may also be a proprioceptive constraint, such as, for example, the modification of the force required to move the head. This constraint will modify the reference eye-to-head coordination strategy.

A measure of the adaptability can be, for example, to determine the amplitude of the eye-to-head coordination error related to the time taken to find an optimal strategy. Thus, a person who can quickly compensate for a large behavioral error will be considered as having good adaptability.

According to another example, after an initial adaptation time, that is, the time taken by the person to adjust his strategy and obtain a new stable behaviour, the constraint is removed. In spite of the absence of constraint, the person will maintain his new behaviour at least during a period before returning to its reference behaviour. It is the after-effect of adaptation.

To modify the diameter of the diaphragm and thus to control the level of constraint on the visual field of view, it is preferable to use active spectacle lenses whose transparency can be changed by an electrical control, for example lenses made in polymer dispersed liquid crystal (PDLC).

Figure 4:
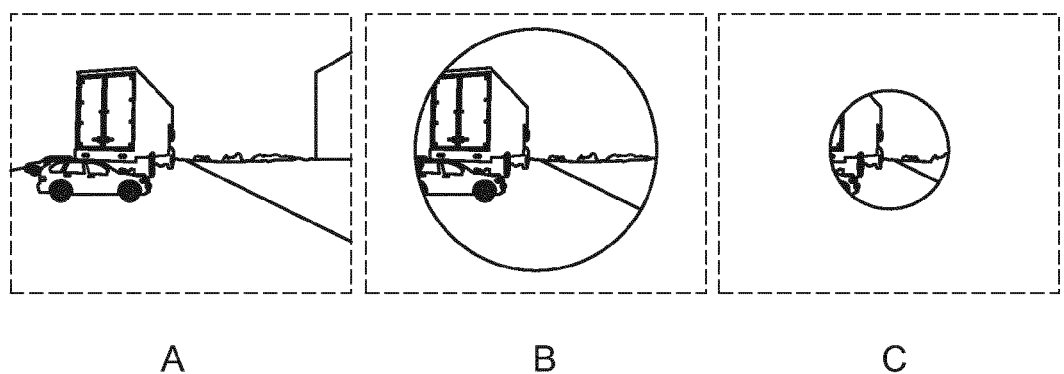
FIG. 4 illustrates a "natural" reference situation (A) and situations (B, C) with increasing constraints on the accessible visual field of view.

Another embodiment of a system according to the invention can comprise a head mounted device (HMD) comprising a virtual reality or augmented reality display device. Thus, it can be proposed to the person wearing and using the HMD to virtually move on a street and cross an intersection in a safe manner. The person wears the HMD and moves with a joystick for example. He or she must observe his/her environment by moving his/her head and eyes to determine the right time to cross the street, avoiding cars and other pedestrians. The measurement of this head-eye coordination would then be compared between a "natural" reference situation and situations with increasing constraints on the accessible visual field of view as illustrated on FIG. 4.

Without having a virtual reality HMD, the same principle of visual field constraint could be achieved with diaphragms of variable diameters, positioned on a test spectacle. The person would then be asked to move through the spectacles store and/or to perform different types of tasks (reading a magazine, choosing a frame . . . ). The behaviour would then be measured, in particular the time taken by the person to carry out all the activities requested. Increasing this time with a visual field constraint would characterize the initial effect. Then, the reduction of this time with the repetition of the tests/activities would characterize the capacity of the person to adapt to the constraint. Such an evaluation could also be carried out using progressive lenses mounted on the test spectacle.

To adjust in a controlled manner the force required to turn the head towards the target to be explored, a standard HMD or the same virtual reality HMD described above could be used. The HMD would be worn by the person and wires would connect this HMD to stable supports positioned on either side of the person. The rotation of the head would be made more difficult in a controlled manner by adjusting the unwinding resistance of the wires.

Thanks to the invention, the design of a customized progressive lens can be therefore determined by managing a compromise between optical aberrations and the adaptability of the person to a visual and/or proprioceptive modification of his environment.

Thus, a design of progressive addition lens (PAL) considered as "soft" will be advantageously determined and proposed to people with low adaptive capacities. Conversely, a "hard" design would be preferred for people with good adaptability.

According to another example, for an individual A having a reference behaviour of the eye-mover type and with low adaptive capacities, a PAL design with very wide field of view would be the best solution. On the other hand, for an individual B having a reference behaviour of the eye-mover type but showing good capacities of adaptation of his eye-head coordination, a PAL design with wider field of view and therefore less aberrations in the periphery could be envisaged. In the same way, the height of the beginning of the power progression in the lens can be adjusted as a function of the adaptability. For a person of eye-mover type, the beginning of the progression will be made lower in the lens. For example, a person C tending to lower his eyes to negotiate an obstacle on the ground and having little adaptability will be equipped with a PAL with a power progression starting lower in the lens. On the other hand, an individual D having a tendency to lower his eyes to negotiate an obstacle on the ground but presenting significant adaptation capacities may be equipped with a PAL with a higher power progression in the lens and thus have nearer vision more accessible, i.e. less low, and thus a better comfort of use of its equipment, even with a small frame.

EXAMPLE 2

Visuo-Proprioceptive Adaptation and Intermediate Distance Work

The advantage of a lens with continuous power progression is to provide the wearer with clear vision at all distances. Nevetheless, this progression of power is necessarily accompanied by deformations at the periphery. The faster the progression, the greater the distortion. It is in the so-called "intermediate vision" zone that the power progression is conventionally the fastest in order to ensure the good compensation value in far vision and near vision. This intermediate vision corresponds to the visual and visuomotor distances involved in work at the office and on screen in particular. The deformations induced by the progression of power therefore generate visual constraints to which the wearer must adapt in order to maintain good performance and good comfort. The objective of this example of implementation of the invention is therefore to measure the capacities of visual and proprioceptive adaptation in the context of a visuomotor task.

For evaluating the adaptability of the person to a visual and proprioceptive modification of its environement, a gradual or continuous and abrupt or discrete change in the visual or proprioceptive constraints of carrying out the task of interception or pointing is achieved. The person must adapt to this change in order to maintain a good performance at the level of the task requested. A measure of adaptability may consist, for example, in determining the amplitude of the deterioration in performance relative to the time taken to recover the same level of performance as when the task is performed without constraint. Thus, a person who can quickly recover his initial level of performance will be considered as having good adaptability.

Then, another type of adaptability evaluation can be carried out when the visual or proprioceptive conditions return to normal, i.e. the situation without constraint proposed at the very beginning of the test. Persons then make a measurable error in achieving the task, called the after-effect. This after-effect is another marker of the adaptation level of the person. Also the adaptation time, i.e. the time required to regain the initial performance level after the addition or withdrawal of the visual or proprioceptive constraint, is a useful indicator for determining the person's adaptability. If the after-effect is high and the return to initial performance is short, it means that the person has completely and quickly adapted to the proposed change. The adaptability can be assessed according to another embodiment of the invention based on the effect of prisms on targeting targets projected on the screen of the system of FIG. 3. Such assessment can be implemented using an instrumented tablet. For example, it would be necessary to add twinned or yoked prisms to a test lens worn by the person. By asking the person to perform visual-vision tasks typical of intermediate vision or near vision, such as pointing (touch pad), reading (eye-tracking camera), . . . , the effects of these prisms on behaviour can be determined. Then, by measuring the performance recovery time and/or reference behaviour (before adding the prisms), an index of adaptability can be determined.

Thanks to the invention, the design of a customized progressive lens can be therefore determined taking into account the adaptability of the person to a visual and/or proprioceptive modification of his environment, more particularly the customized characteristics of the form of power progression in the so-called intermediate vision zone. The measurement of the adaptability described above makes it possible to propose a personalized evolution of this form of progression in intermediate vision. For a person with good adaptability, a double-progression form as shown diagrammatically in FIG. 5A, inducing stronger peripheral constraints, is advantageously proposed. The smaller the adaptation capacities, the more the suitable design for the person is a "classical" form of progression as shown in FIG. 5B, resulting in less overall visual constraints.

EXAMPLE 3

Adaptation to Blur and Distortions

Thanks to the invention, a new criterion for the personal distribution of the peripheral distortions can be provided, distortions and blur, as a function of the capacities of the person to adapt to these constraints.

As in the previous examples, the adaptability of a person to an abrupt or gradual change in his environment is assessed. In the present example, distortions and/or blur are added in the scenes perceived by the person and the effect of these constraints on the performance and the time required to recover the level of performance the person had before adding distortions/blur are evaluated. These elements can also be evaluated after the removal of the visual constraints by determining what is called the after-effect of these constraints.

Distortions and blur could be induced using special lenses positioned in a test spectacle for example. For example, the person might have to perform tasks on a digital tablet in close-up view. Using a camera on the tablet, postural changes in head positioning and changes in exploration strategies for eye movements and eye-head coordination can be measured. These measurements could also be carried out in an immersion vault using a virtual reality HMD or on a driving simulator.

Thanks to the invention, the choice of the progressive lens for the person can be adapted to the adaptability of the person. For people with low distorting capabilities, lenses having "soft" designswould be the most recommended for rapid adaptation. For people with greater distortion capabilities, "hard" designs could be envisaged, enabling the provision of wide vision zone.

The method according to the invention also allows recommendations on the level of similarity that two progressive lens designs should have when a person passes from one to the other. Thus, a presbyop needing to change optical correction and having low capacities, should be oriented towards a new progressive lens similar to or slightly different from the previous one. Also, if the change in correction between the optical equipments is very important, it would be appropriate to consider "intermediate" optical equipment to ensure that the adaptation jump is not too high. Conversely, an individual with great adaptability will be able to get 100% of his new correction, even if it is very different from the previous one, and be oriented towards any type of new progressive lens design.

EXAMPLE 4

In this example, the visuomotor activity considered is reading and the measured parameter is reading speed and more particularly the number of words per minute.

The reference value is measured on a digital medium, such as a tablet, the wearer must read text with test lenses, including the best correction for distance vision to which a reading proximity compensation power is added.

The modification means of a system according to the invention comprises a constraint device configured to impose a constraint on the wearer relating to the size of his perceptual span. The perceptual span is defined as the region of the visual field around the point of fixation within which the useful information is extracted. The system further comprises a camera and software for monitoring the position of the gaze of the wearer. Thanks to the camera and software, a more or less important restriction of the perceptual span is applied. FIG. 6 illustrates a progressive blur applied to the letters adjacent to the letter r on which the gaze is fixed during the reading of the sentence. The consequence of this constraint is a decrease in reading speed. The angular size of the span is gradually reduced until a read speed of 50% of the initial value is reached.

After the initial decrease in reading speed induced by the restriction of the perceptual span, the ability of the wearer to increase his reading speed over time is determined. A reading time of 30 minutes is proposed. At the end of this period of adaptation to the visual constraint, the reading speed is measured relative to the initial value. A wearer having regained its initial reading speed will have an adaptation index equal to 1. A wearer remaining at 50% of its initial reading speed after the 30 minutes reduced perceptual span constraint will have an adaptation index of 0.

In this example, during the determining step of the method, recommendation concerning the width of the near vision zone on a progressive powered lens is determined. A wearer with an adaptation of 1 will be able to adapt to a strong reduction of its field in near vision. This makes it possible to propose to him a reduced field width in this vision zone in favor of zones that are clearer in the rest of the lens.

EXAMPLE 5

In this example, the visuomotor activity considered is gripping or pointing and the measured parameter is gripping or pointing error.

To measure the reference value the person 70 is placed in front of a screen 72 on which visual targets are projected as illustrated on FIG. 7. Thanks to a mirror 74, the person perceives the space in front of him without being able to see his hands. A touch screen 76 is located at the same apparent distance as the projection screen of the targets. Without having a visual feedback on the position of his hand in space, the person must go to point the specified targets. A visual feedback on the error of pointing is given to him. The person does not make any corrections. The visual targets to be pointed are contrasting light spots on a uniform background. They can therefore be easily detected even at low spatial resolution. Usually, 2 or 3 tests are necessary for the wearer to perform this task perfectly, without constraint.

In this example, the constraint device comprises modification means configured to modify the spatial correspondence between the visual space A and the pointing space B. Thus, by performing the same movement as before, the person will make a pointing error on the projected targets. The shift between the two spaces can be done using twinned or yoked prisms or more simply by shifting the device and/or the pointing reference frame.

Figure 8:
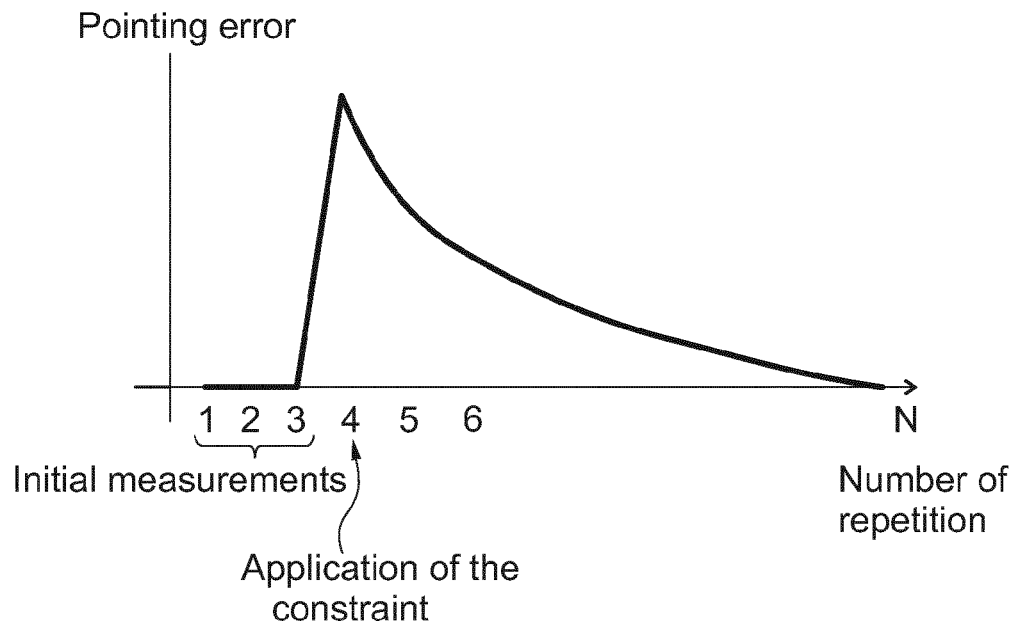
FIG. 8 represents a diagram of the evolution of the performance over time.

The person will initially make a pointing error when the two spaces are no longer in spatial correspondence. The number of repetitions of the pointing task on targets of various positions in the screen is measured before obtaining a zero error. The evolution of the performance can then be represented as on FIG. 8.

A person having fast adaptation (N<10) may be oriented towards a lens design that is harder than a personwith a slow or even incomplete adaptation (N>10).

EXAMPLE 6

In this example, the visuomotor activity considered is navigation and obstacle negotiation and the measured parameter is safety margin for the negotiation of an obstacle and/or vertical eye-head coordination.

The reference measure consists of asking a person to move towards a visual target, in far vision, straight ahead. Between the person and the target, an obstacle is positioned, that the person will have to negotiate. This may involve, for example, climbing or descending a step, passing over a board, etc. The test is carried out, for example, in a virtual reality HMD in which the configuration and the texture of the room are simulated. Thus, the person moves in the real environment in the same way as in the simulated environment. The person must perform a navigational task during which the person must follow a course, avoid obstacles on the ground, etc. The performance of this visuomotor activity is measured in an initial condition, with a complete visual field. In particular, the safety margins taken by the foot can be measured to pass over the ground obstacles, also called Toe Clearance (TC).

The constraint imposed in this example consists in gradually reducing the dimension of the visual field, by means of a diaphragm or a peripheral blur. More particularly, it will be necessary to produce a blur equivalent to 1.00D of optical defocus, for example, in the lower part of the field of view.

The upper end of the visual field restriction begins for example at 30° below the right front view. It then goes up gradually, as the tests progress. As soon as a performance degradation is measured, i.e. an increase in the TC value in the present example, the tests are repeated, the rise in the blur zone is maintained to the latter condition (constraint A) and the tests are carried out repeated 10 to 20 times. The evolution of the TC is recorded. If the person regains the same performance as the initial performance, plus or minus 10%, at the end of the repetitions, the blur zone resumes its rise, and so on. When the person is no longer able to adapt to the restriction of the imposed field of view, a second constraint value is obtained, called constraint B.

The values obtained for "constraint A" and "constraint B" make it possible to characterize an acceptable zone in which to position the point of the meridian corresponding to a blur of 1.00D. Thus, for a wearer having a value for constraint A equal to 10° and a value for constraint B equal to 5, and thus presenting a first performance degradation, to which it can adapt, when the border of the blur lower zone is at 12° below the straight gaze in front and a performance degradation to which it can not adapt, when the boundary of the blur lower zone has risen to 4° below the right gaze in front, the point of the meridian of power progression corresponding to 1.00D of addition will therefore have to be positioned inside this zone of 8° and ideally, according to the other compromises to be made on the lens, as near as possible to the constraint A position, at 12° below the straight gaze in front of the present example.

EXAMPLE 7

In this example, the visuomotor activity considered is target interception and the measured parameter is successful intercept rate.

During the reference state, the person looks at an inclined screen on which targets move in space, heading towards him. Using a joystick, the person must intercept these targets before they reach an area considered "out of range". The number/frequency and speed of the targets are adjusted individually to achieve 100% interception performance.

Thanks to the system illustrated on FIG. 3, the relationship between the physical effort to be made to move the joystick and the actual movement on the screen of the "virtual racket" with which the person must intercept the targets can be modify. The constraint is increased gradually until the performance of the person can no longer reach 100% success. Then, we go back to the last value to keep 100% success. This value, Cmax, is unique to each person.

Figure 9:
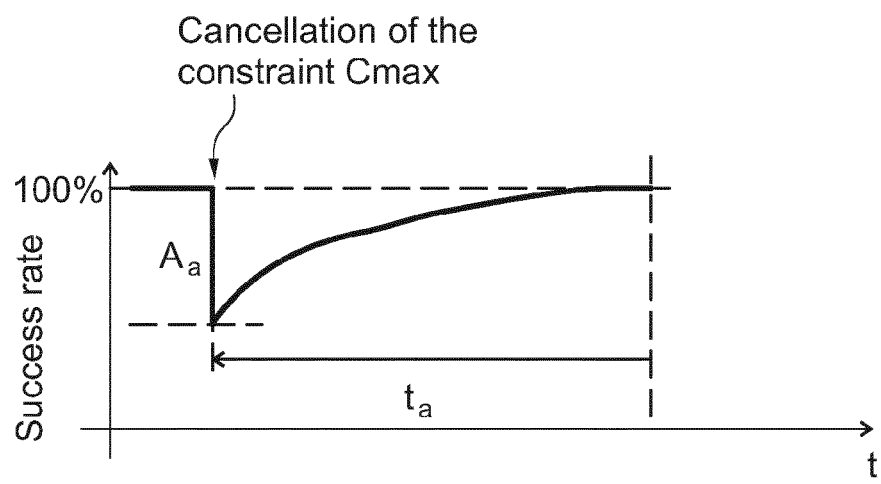
FIG. 9 represents a diagram of the evolution of success rate over time.

When the Cmax constraint is removed, the interception performance degrades. It is the after-effect of adaptation to this constraint. An example of a criterion for measuring the adaptation of the person considers the return time at 100% of performance, once the constraint Cmax has been removed, and the amplitude of the return effect. The ratio of the amplitude of the performance degradation after the withdrawal of the constraint Cmax (A) and the return time to 100% interception (ta), could characterize an adaptability in %.s−1. FIG. 9 illustrates such measurements.

The invention has been described above with the aid of embodiments without limitation of the general inventive concept, as defined in the enclosed set of claims.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining an optical system intended to equip a person on a basis of adaptability of the person to a visual and/or proprioceptive modification of an environment of the person, the method comprising:
   obtaining a person visual behavior parameter indicative of the visual behavior of the person relative to a given state of the environment;
   obtaining a first value of the person visual behavior parameter corresponding to a reference state of the environment:
   providing a visual and/or proprioceptive modification of the reference state of the environment so as to define a modified state of the environment;
   determining an optical parameter of the optical system based on the first value of the person visual behavior parameter and on a second value of the person visual behavior parameter associated with the modified state of the environment; and
   canceling the provided visual and/or proprioceptive modification, the second value of the person visual behavior parameter being further associated with the canceling of the visual and/or proprioceptive modification so as to take into account an after-effect value of the person visual behavior parameter of the person for the determination of the optical parameter of the optical system.

2. The method according to claim 1, further comprising evaluating an index representative of the adaptability of the person based on the first and second values of the person visual behavior parameter.

3. The method according to claim 1, wherein the person visual behavior parameter comprises visual-motor coordination data representative of the visual-motor coordination of the person.

4. The method according to claim 1, further comprising: displaying, on a visual display device, a dynamic visual pattern to the person at least during the modified state.

5. The method according to claim 4, wherein the dynamic visual pattern displayed by the visual display device to the person comprises a varying blur parameter and/or a varying defocus parameter and/or a varying distortion parameter and/or a varying field of view parameter.

6. The method according to claim 1, wherein the providing of the visual and/or proprioceptive modification includes providing a constraint to the person, the constraint comprising:
   a motor constraint associated to a control of postural stability or of locomotion of the person; and/or
   a constraint associated to movements of a head of the person; and/or
   a proprioceptive constraint of the person.

7. The method according to claim 1, further comprising measuring the person visual behavior parameter of the person.

8. The method according to claim 7, wherein the person visual behavior parameter is measured upon a perception test carried out on the person.

9. The method according to claim 1, wherein the optical system comprises an ophthalmic lens.

10. The method according to claim 9, wherein the optical parameter of the ophthalmic lens comprises at least lens design data indicative of a lens design adapted to the person.

11. The method according to claim 10, wherein the lens design comprises at least dioptric lens design and/or a distortion distribution and/or geometrical parameters of the ophthalmic lens and/or prescription data and/or ophthalmic parameters relating to ophthalmic requirements of the person.

12. The method according to claim 1, wherein
   the optical system comprises a progressive addition lens, and
   the first and second values of the person visual behavior parameter are indicative of a capability of the person to adapt to the progressive addition lens.

13. A computer program product comprising one or more stored sequences of instructions that are accessible to a processor and which, when executed by the processor, causes the processor to carry out the steps of claim 1.

14. A system for determining an optical system intended to equip a person on a basis of an evaluation of adaptability of the person to a visual and/or proprioceptive modification of an environment of the person, the system comprising:
   processing circuitry configured to
      receive a first value of a person visual behavior parameter indicative of the visual behavior of the person relative to a given state of the environment, the first value corresponding to a reference state of the environment,
      provide to the person a visual and/or proprioceptive modification of the reference state of the environment so as to define a modified state of the environment,
      provide a visual and/or proprioceptive modification cancelation, a second value of the person visual behavior parameter being configured to be associated with the cancellation of the visual and/or proprioceptive modification, inducing an after-effect value of the person visual behavior parameter of the person, and
      determine an optical parameter of the optical system on the basis of the first value of the person visual behavior parameter and of the second value of the person visual behavior parameter associated with the modified state of the environment and the after-effect value of the person visual behavior parameter.

15. A method for determining an optical system intended to equip a person on a basis of an evaluation of adaptability of the person to a visual and/or proprioceptive modification of his environment, the method comprising:
   receiving a first value of a person visual behavior parameter indicative of the visual behavior of the person relative to a given state of the environment, the first value corresponding to a reference state of the environment;
   providing to the person a visual and/or proprioceptive modification of the reference state of the environment so as to define a modified state of the environment; and
   determining an optical parameter of the optical system on the basis of the first value of the person visual behavior parameter and of a second value of the person visual behavior parameter associated with the modified state of the environment, wherein
   the providing of the visual and/or proprioceptive modification includes providing a constraint to the person, the constraint comprising a proprioceptive constraint of the person.

16. The method according to claim 15, wherein the constraint comprises a motor constraint associated to a control of postural stability or of locomotion of the person.

17. The method according to claim 15, wherein the constraint comprises a constraint associated to movements of a head of the person.

* * * * *